(12) United States Patent
Karak

(10) Patent No.: US 12,155,548 B1
(45) Date of Patent: Nov. 26, 2024

(54) ANOMALY DETECTION IN CONTENT DELIVERY NETWORKS

(71) Applicant: Amazon Technologies, Inc., Seattle, WA (US)

(72) Inventor: Samrat Karak, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/443,794

(22) Filed: Jul. 27, 2021

(51) Int. Cl.
| | |
|---|---|
| *H04L 43/0823* | (2022.01) |
| *G06N 20/00* | (2019.01) |
| *H04L 9/40* | (2022.01) |
| *H04L 41/16* | (2022.01) |
| *H04L 43/028* | (2022.01) |
| *H04L 43/06* | (2022.01) |

(52) U.S. Cl.
CPC ......... *H04L 43/0847* (2013.01); *G06N 20/00* (2019.01); *H04L 41/16* (2013.01); *H04L 43/028* (2013.01); *H04L 43/06* (2013.01); *H04L 63/1425* (2013.01)

(58) Field of Classification Search
CPC ... H04L 43/0847; H04L 41/16; H04L 43/028; H04L 43/06; H04L 63/1425; G06N 20/00
See application file for complete search history.

(56) References Cited

U.S. PATENT DOCUMENTS

| | | | |
|---|---|---|---|
| 10,812,846 B1* | 10/2020 | Vantalon | H04N 21/2408 |
| 11,233,768 B1* | 1/2022 | Flack | H04L 61/4511 |
| 2019/0052518 A1* | 2/2019 | Gal | H04L 43/08 |
| 2020/0042473 A1* | 2/2020 | Dalmatov | G06F 13/20 |
| 2020/0193234 A1* | 6/2020 | Pai | G06K 9/6262 |
| 2020/0349390 A1* | 11/2020 | Konwar | G06F 18/2185 |
| 2021/0184958 A1* | 6/2021 | Kolar | G06K 9/6267 |
| 2022/0050814 A1* | 2/2022 | Alt | G06N 3/08 |
| 2022/0101270 A1* | 3/2022 | Tenneti | G06F 11/0751 |
| 2022/0124110 A1* | 4/2022 | Chhabra | H04L 63/1416 |
| 2022/0156121 A1* | 5/2022 | Parthasarathy | G06F 11/3051 |
| 2022/0172100 A1* | 6/2022 | Balasubramanian | G06V 10/7788 |
| 2022/0376994 A1* | 11/2022 | Mishra | H04L 41/16 |

* cited by examiner

*Primary Examiner* — Gil H. Lee
*Assistant Examiner* — Chhian (Amy) Ling
(74) *Attorney, Agent, or Firm* — Knobbe Martens Olson & Bear LLP

(57) ABSTRACT

A system, method, and computer-readable medium for managing content delivery networks are provided. A content delivery network can train a set of machine learned algorithms corresponding to anomaly detection in the hosting of content. The content delivery network can obtain log information from a plurality of POPs and additional information for use as inputs to selected machine learned algorithms. The content delivery network can the generate a set of recommendations as either CDN performance recommendations or CDN analysis recommendations for customers.

26 Claims, 8 Drawing Sheets

ANOMALY DETECTION IN CONTENT DELIVERY NETWORKS

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages or resources identified in Web pages, through the utilization of a content delivery network ("CDN") service provider. A CDN service provider typically maintains a number of computing devices, generally referred to as "points of presence" or "POPs" in a communication network. The service provider POPs can include one or more domain name service ("DNS") computing devices that can process DNS queries from client computing devices. Additionally, the POPs can include network resource storage component that maintain content from various content providers. In turn, content providers can instruct, or otherwise suggest to, client computing devices to request some, or all, of a content provider's content from the CDN service provider's computing devices. Upon receipt of resource requests from such client computing devices, a CDN service provider typically delivers the requested resource in accordance with terms (such via a service plan) specified between a corresponding content provider and the CDN service provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
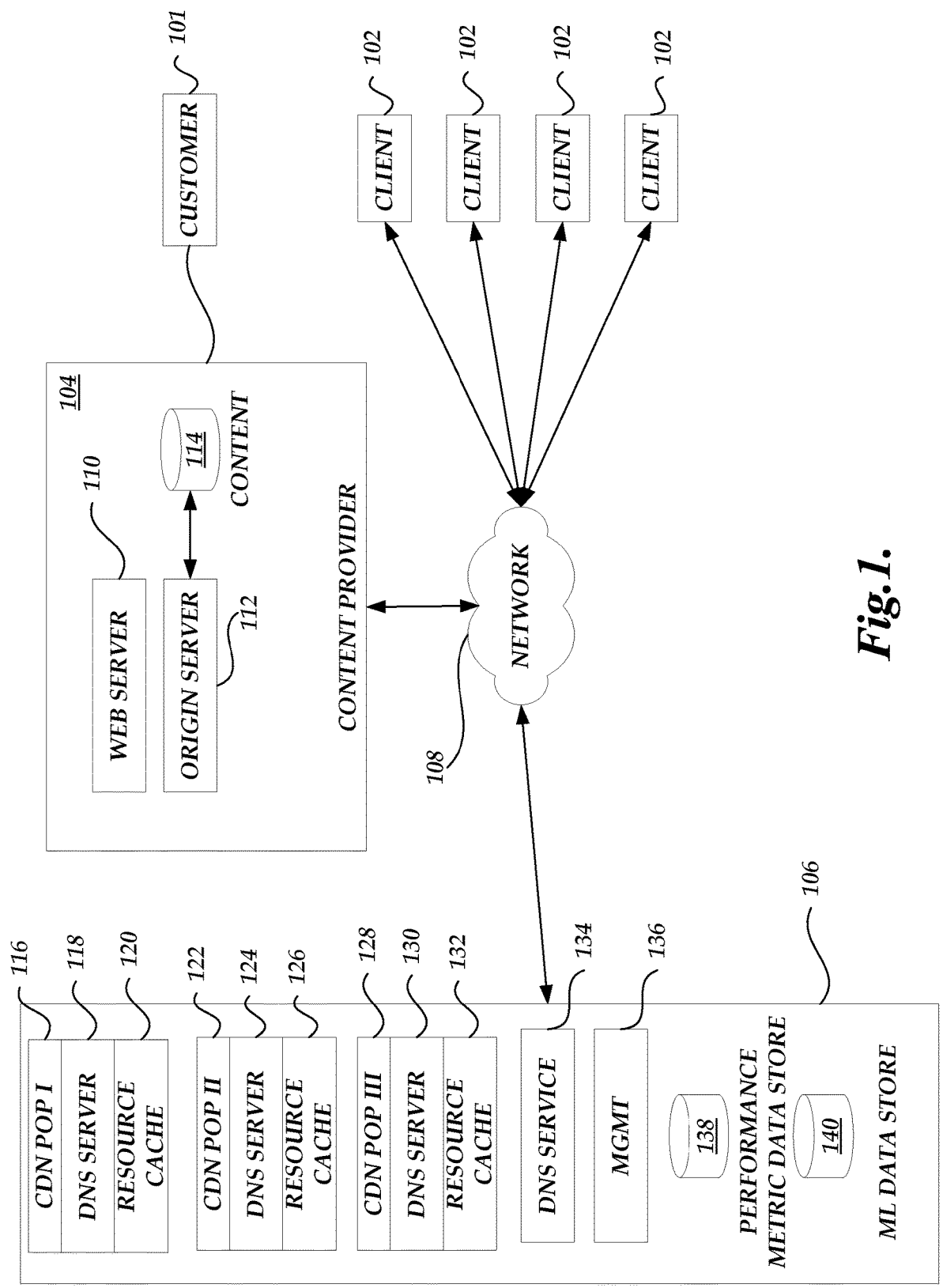
FIG. 1 is a block diagram illustrative of content delivery environment including a number of client computing devices, customer devices, content provider, and a content delivery network service provider.

Generally described, the present disclosure is directed to facilitating content requests for a network resource. More specifically, one or more aspects of the present application correspond to a recommendation service for improving the management of content delivery networks ("CDN"). Traditional content delivery management components make performance metrics available to customers, such as via log information generated by the CDN. However, customers typically require a higher level of expertise, such as system administrators, to analyze the performance metrics to identify anomalies or otherwise modify configurations. Because potential anomalies can result from different aspects associated with the configuration or implementation of a CDN, customers may not readily be able to identify anomalies or understand appropriate mitigation techniques to address errors or improve performance. Accordingly, CDN networks can be inefficient in experiencing lower throughput, increased or repeated errors, increased or repeated latencies, and the like.

To address at least a portion of the above errors in the implementation of a CDN for customer, and to improve customer experience, one or more aspects of the present application correspond to an incorporation of a set of machine learned algorithms that have been trained according to identified anomalies in content delivery networks on behalf of customers. The content delivery network can obtain log information from a plurality of points of presence ("POPs") and additional information for use as inputs to selected machine learned algorithms. The additional information can illustratively include historical performance metric information, CDN configuration information and the like. For example, the CDN configuration information can include caching information, origin source information, API configuration or usage information, and the like. The CDN configuration information can also include configuration information for various services utilized in the operation of the CDN, such as logging services, data processing services, and the like. Individual machine learned algorithms may be trained with regard to identifiable or specific anomalies based on inputs associated with individual CDN customers. The training sets used in the machine learned algorithms may be based on a plurality of customers of the CDN or customized from individual CDN customer information/preferences.

Based on the outputs of selected machine-learned algorithms, the content delivery network can then generate a set of recommendations, which are illustratively characterized as either CDN performance recommendations or CDN analysis recommendations for customers. By way of example, the CDN performance recommendations can be characterized as including cache configuration recommendations, compression configuration recommendations, time to live value recommendations, and the like. The CDN performance recommendations can further be characterized as including recommended settings, configurations or other information related to adjustment of the additional services utilized in the CDN. For example, the recommendations can include modification of data logging specifications to allow for increased data collection or to avoid loss of data. In another example, the recommendations can include a specification of additional data redundancy or duplication services to facilitate data recovery. Similarly, the CDN analysis recommendations can be characterized as including include information characterizing client impact by an event, information characterizing origin source errors, information characterizing performance degradation, information characterizing cache performance, and the like. Customers receiving the recommendations can implement one or more configuration changes, mitigation techniques, etc., including configuring the CDN service provider with processing rules that allow for automatic implementation.

Although various aspects of the disclosure will be described with regard to illustrative examples and embodiments, one skilled in the art will appreciate that the disclosed embodiments and examples should not be construed as limiting. For example, although aspects of the disclosure will be described with regard to specific service providers such as a CDN service provider, one skilled in the relevant art will appreciate that aspects of the disclosure may be implemented by various types of service providers or that a service provider implementing aspects of the disclosure is not required to have the specific components utilized in the illustrative examples.

FIG. 1 is a block diagram illustrative of content delivery environment 100 for the management and processing of content requests. As illustrated in FIG. 1, the content delivery environment 100 includes a number of customer computing devices 101 (generally referred to as customers) that will be utilized to transmit configurations and receive recommendations on behalf of customers of the CDN service network. The content delivery environment 100 further includes a number of client computing devices 102 (generally referred to as clients) for requesting content from a content provider, a CDN service provider, or other service provider. In an illustrative embodiment, the customer computing devise 101 and client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the customer computing devices 101 and client computing devices 102 include necessary hardware and software components for establishing communications over a communication network 108, such as a wide area network or local area network. For example, the customer computing devices 101 and client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS nameservers, and the like. For example, although not illustrated in FIG. 1, the content provider 104 can be associated with one or more DNS nameserver components that receive DNS queries associated with the domain of the content provider 104 and that would be authoritative to resolve client computing device DNS queries corresponding to a domain of the content provider (e.g., return an IP address responsive to the DNS query). A DNS nameserver component is considered to be authoritative to a DNS query if the DNS nameserver can completely resolve the query by providing a responsive IP address.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS nameserver computing devices for resolving DNS queries from the client computers 102. Each POP 116, 122, 128 also includes a resource cache component 120, 126, 132 made up of a number of cache server computing devices for storing resources from content providers and transmitting various requested resources to various client computers. The CDN service provider 106 may maintain one or more request routing services 134 for processing DNS queries independent of the POPs associated with the CDN service provider 106.

In accordance with aspects of the present application, the CDN service provider 106 can further include a CDN performance metric processing service 136 for processing collected performance metric information according to a set of machine learned algorithms as described herein. Illustrative components of a CDN performance metric processing service 136 will be described with regard to FIG. 2. Still further, the CDN service provider 106 includes a CDN performance metric information data store 138 for maintaining information regarding historical and collected performance metric information (per customer) and corresponding customer preferences. The CDN performance metric information data store 138 can also maintain information related to the additional services utilized by the CDN, including but not limited to, data processing services, data logging/storage services, and the like. The CDN service provider 106 includes a machine learned model data store 140 for maintaining a set of machine learning models related to anomaly detection in the CDN, training data utilized by the CDN service provider 106 and a set of machine learned models configured for anomaly detection. In an illustrative embodiment, the data stores 138 and 140 corresponds to a central data store accessible to the CDN performance metric processing service 136. However, one or more implementations of the data stores 138, 140 may be implemented in a distributed manner.

The DNS components 118, 124 and 130 and the resource cache components 120, 126 132 may further include additional software or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN Provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

Figure 2:
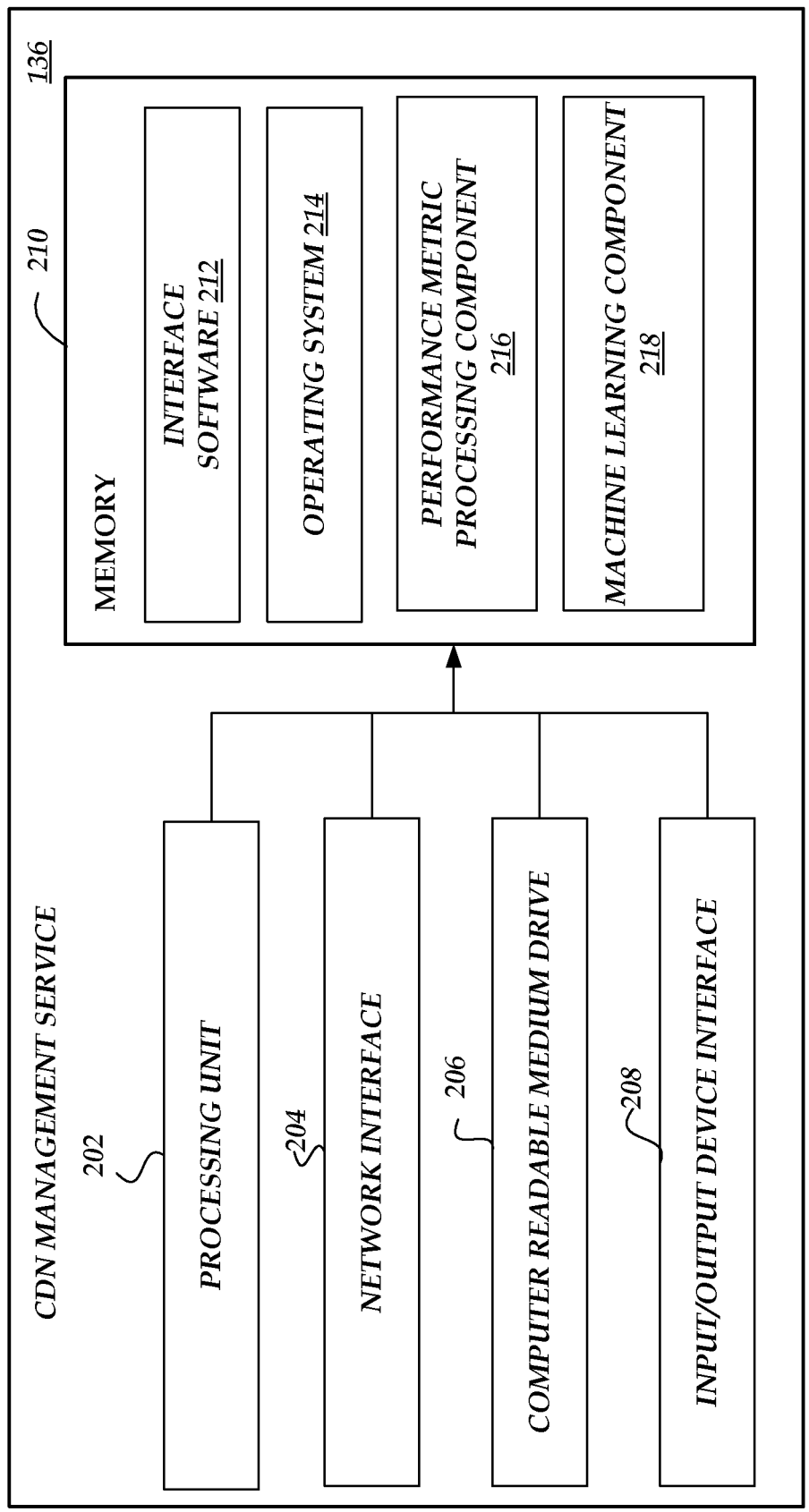
FIG. 2 is a block diagram illustrative of components of service management component corresponding to a CDN performance metrics processing component in accordance with aspects of the present application.

FIG. 2 depicts one embodiment of an architecture of an illustrative server for implementing the CDN performance metric processing service 136 as described. The general architecture of the CDN performance metric processing service 136 depicted in FIG. 2 includes an arrangement of computer hardware and software components that may be used to implement aspects of the present disclosure. As illustrated, the CDN performance metric processing service 136 includes a processing unit 202, a network interface 204, a computer readable medium drive 206, and an input/output device interface 208, all of which may communicate with one another by way of a communication bus. The components of the CDN performance metric processing service 136 may be physical hardware components or implemented in a virtualized environment.

The network interface 208 may provide connectivity to one or more networks or computing systems, such as the network 108 of FIG. 1. The processing unit 204 may thus receive information and instructions from other computing systems or services via a network. The processing unit 204 may also communicate to and from memory 210 and further provide output information for an optional display via the input/output device interface 206. In some embodiments, the CDN performance metric processing service 136 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 206 in the general administration and operation of the CDN performance metric processing service 136. The memory 210 may further include computer program instructions and other information for implementing aspects of the present disclosure. For example, in one embodiment, the memory 210 includes a CDN performance metric processing component 216 that is configured to process a set of inputs, apply selected machine learned algorithms and generate a set of recommendations as described herein. Sill further, the memory 210 can also include machine learning component 218 that is configured to generate machine learned algorithms corresponding to identifiable anomalies in a CDN network.

Illustratively, in a supervised training environment, the CDN performance metric processing service 136 trains the machine learning algorithm to form a machine learned algorithm based on training sets that correspond to processing inputs and generating outputs associated with identifying anomalies in the operation of the CDN network. However, by way of non-limiting examples, the machine learning algorithms can incorporate different learning models, including, but not limited to, a supervised learning model, an unsupervised learning model, a reinforcement learning model or a featured learning model. Depending on the type of learning model adopted by the machine learning algorithm, the configuration for processing with the collected individual information can vary (e.g., using a training set for a supervised or semi-supervised learning model). In other embodiments, the machine learning algorithm can implement a reinforcement-based learning model that implements a penalty/reward model implemented by the CDN performance metric processing service 136. As described above, individual machine learned algorithms may be trained with regard to identifiable or specific anomalies based on inputs associated with individual CDN customers. The training sets used in the machine learned algorithms may be based on a plurality of customers of the CDN or customized from individual CDN customer information/preferences.

Figure 3:
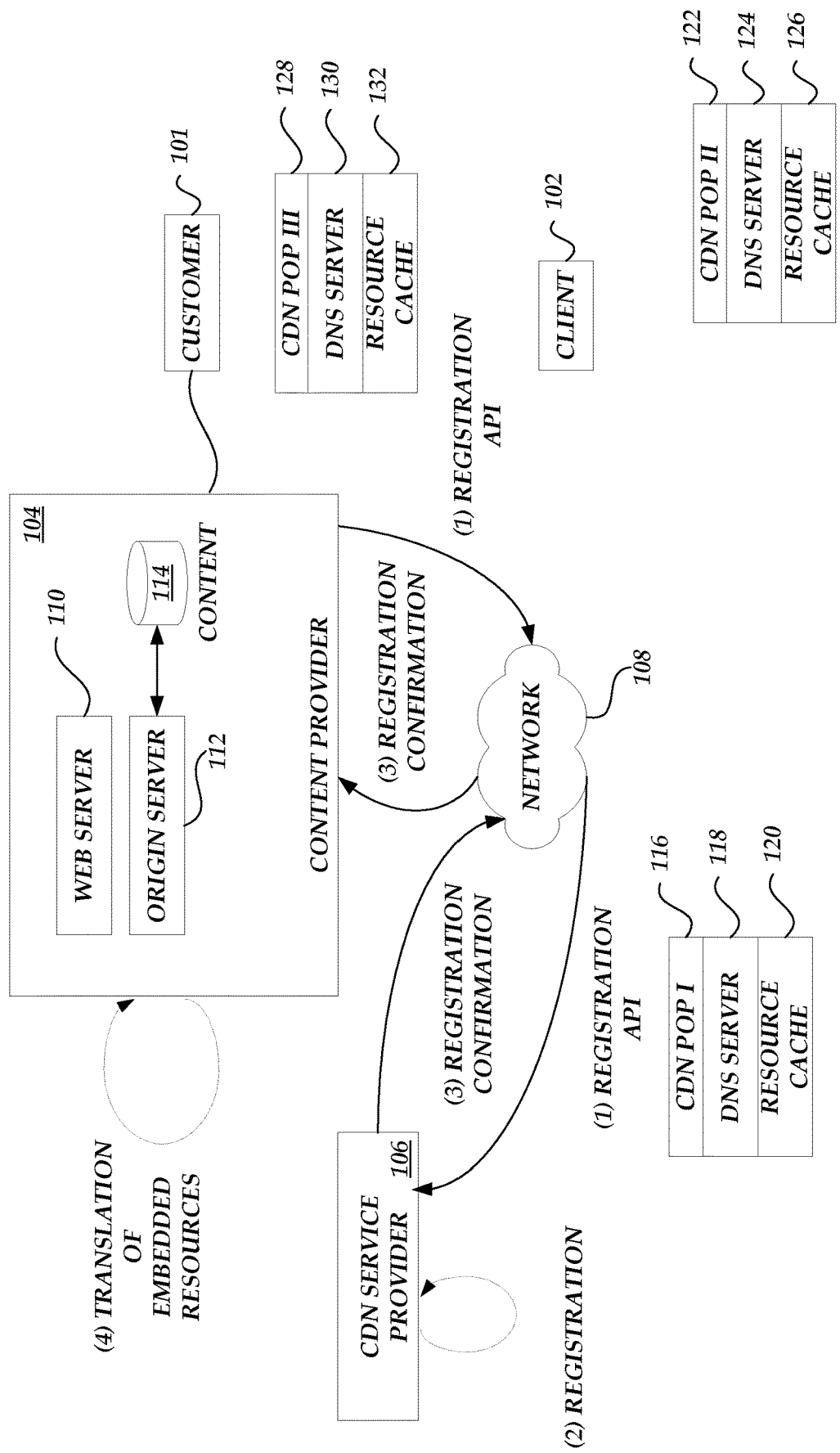
FIG. 3 is a block diagram of the content delivery environment of FIG. 1 illustrating the registration of a content provider with a content delivery service provider.
Figure 4A:
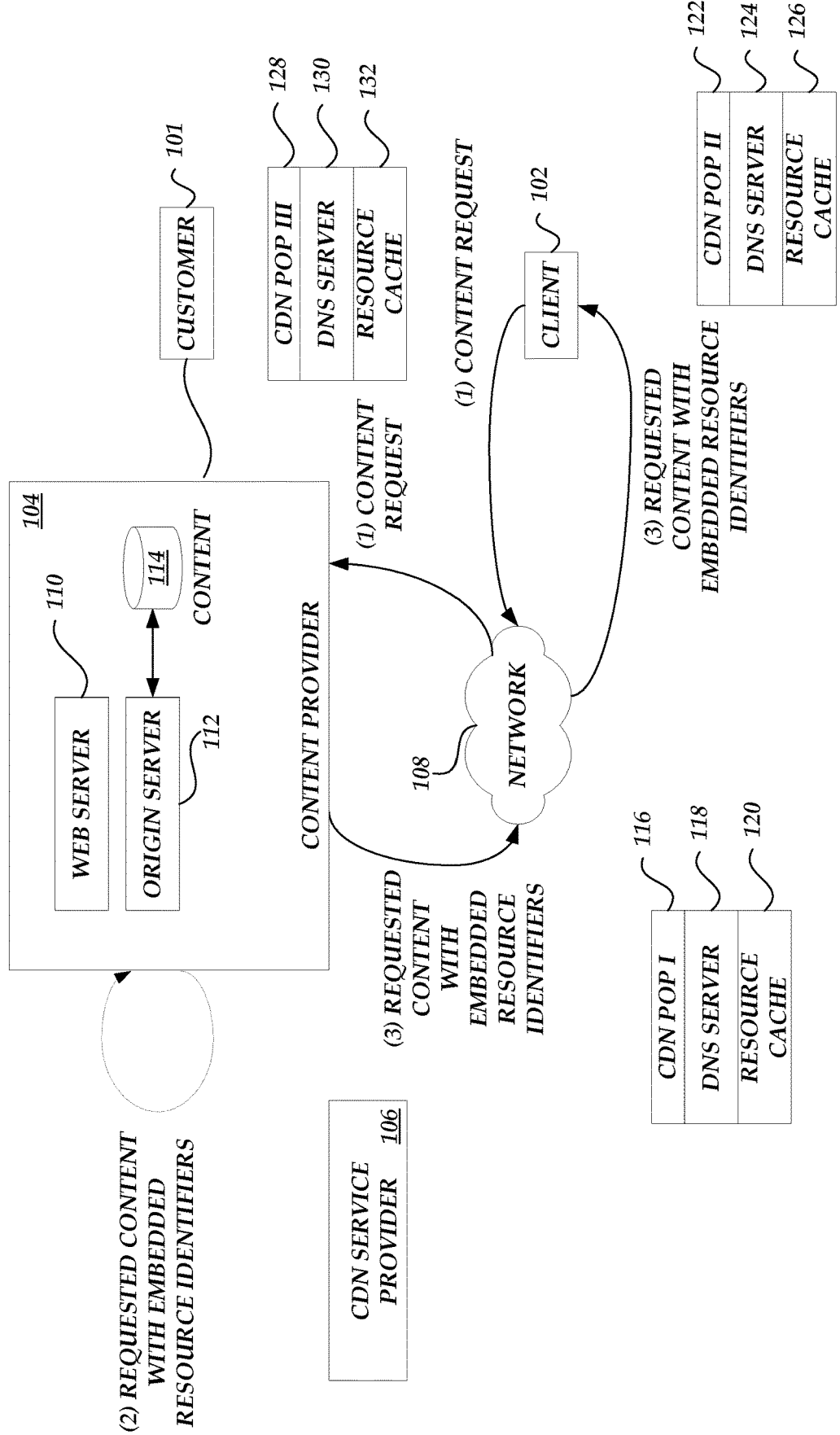
FIG. 4A-4C are block diagrams of the content delivery environment of FIG. 1 illustrating the generation and processing of a content requests from client computing devices to a content provider.
Figure 4B:
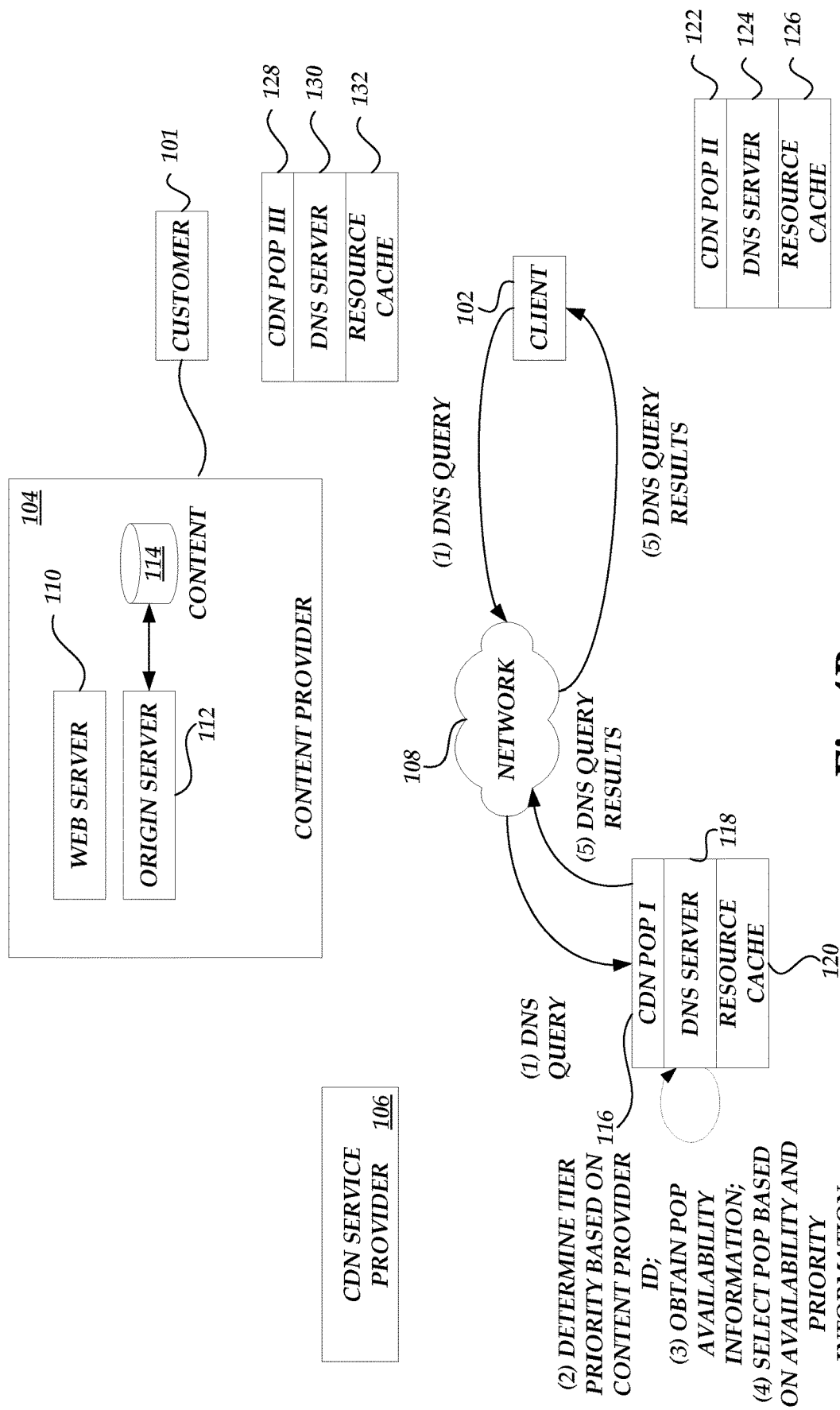
Figure 4C:
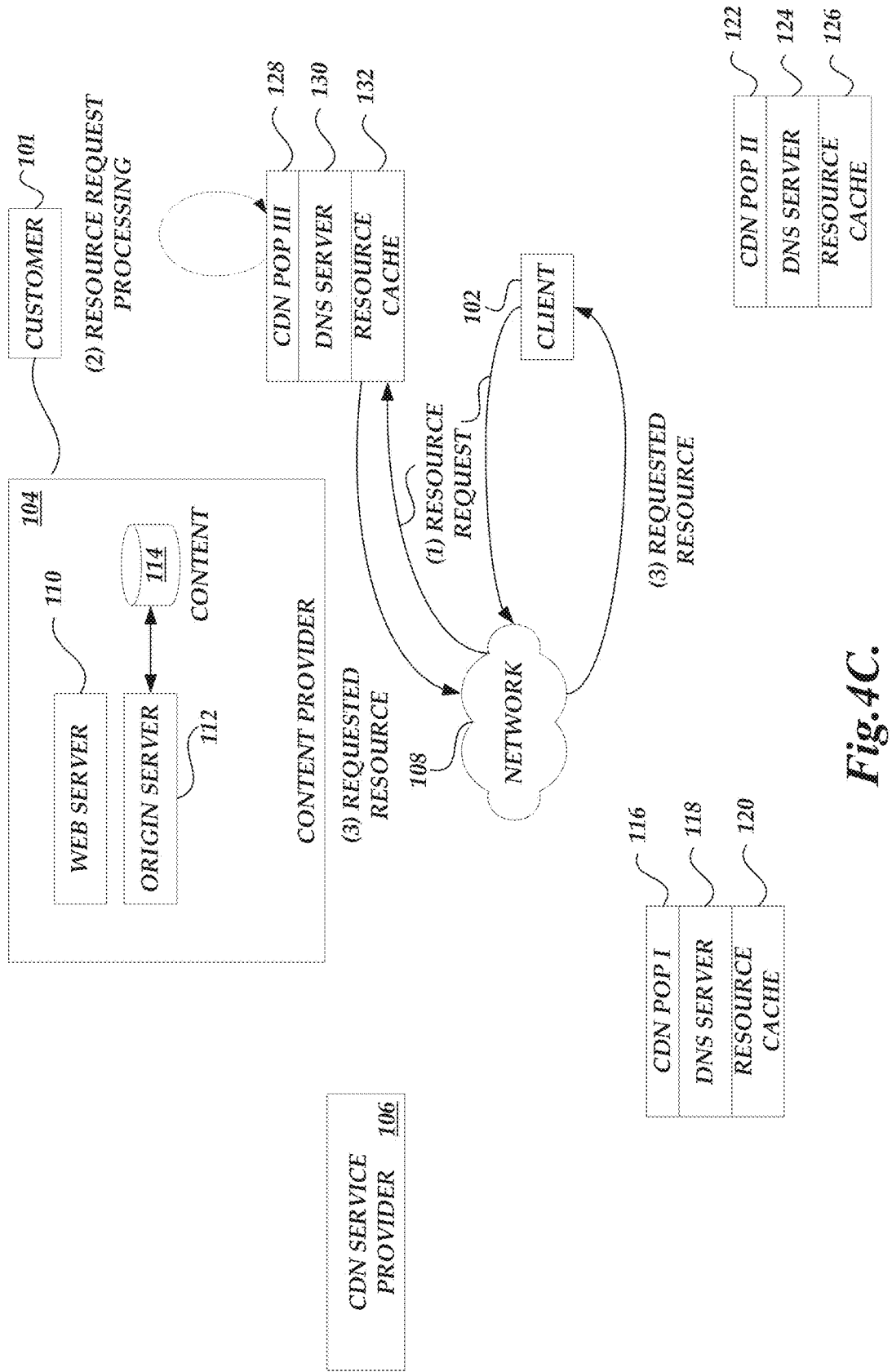
Figure 5:
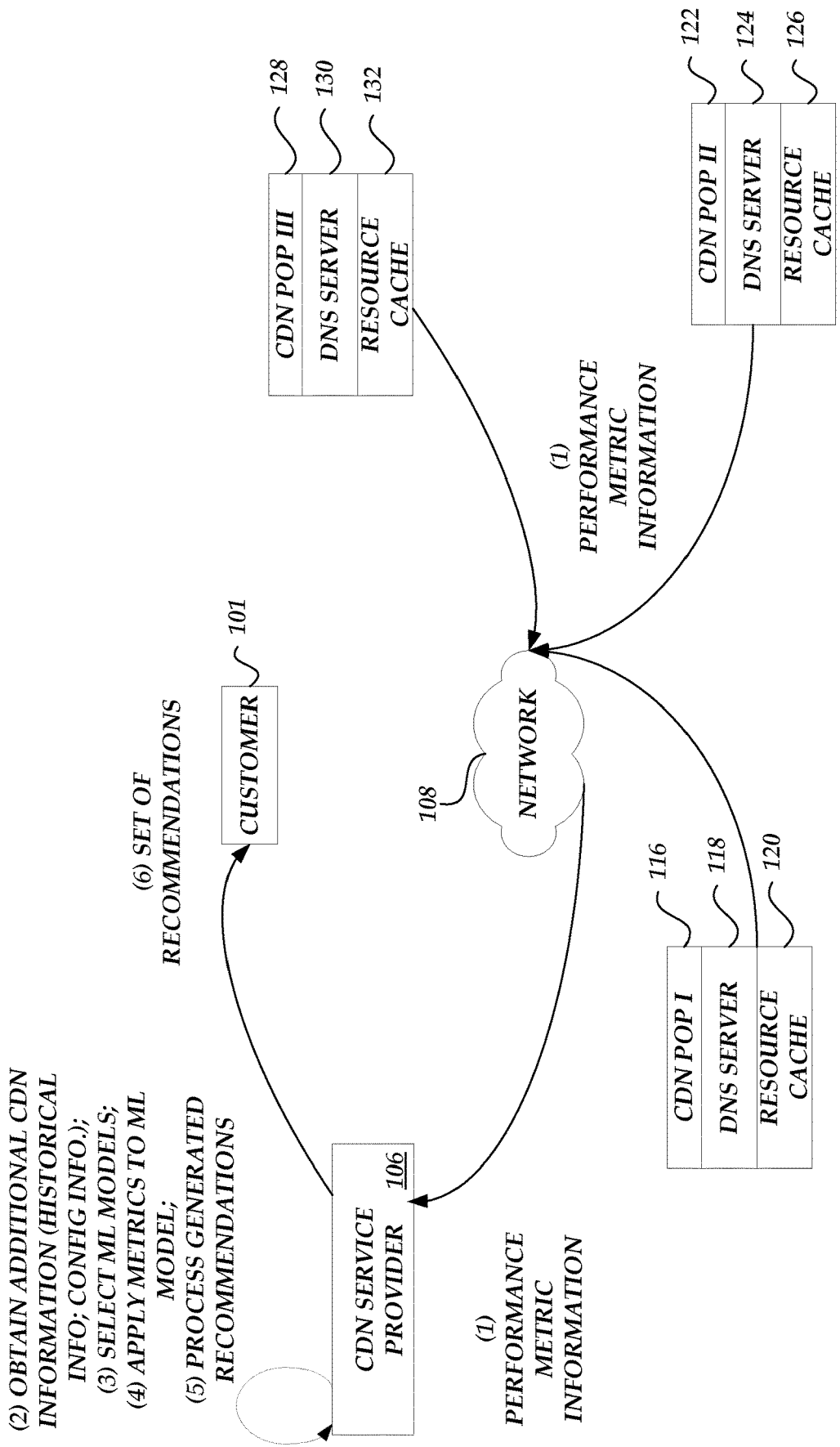
FIG. 5 is a block diagram of the content delivery environment of FIG. 1 illustrating the generation and processing of content delivery configuration recommendations by a content delivery network service provider.

With reference now to FIGS. 3-5, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 3, an illustrative interaction for registration of a content provider 104 with the CDN service provider 106 will be described. As illustrated in FIG. 3, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, as will be explained in greater detail below, the content provider 104 can also provide information that may utilized by the CDN service provider 106 to form recommendations, filter recommendations or otherwise implement recommendations. For example, the content provider 104 can provide financial criteria that may specific thresholds or limits that the content provider 104 is willing to incur and will affect corrective actions or mitigation factors. In another example, the content provider 104 can specify operational parameters that may be utilized as inputs to the machine learned algorithms, such as configuration settings of the origin server, ISPs, or other information that may not be provided by the content provider 104 as part of the utilization of the CDN.

One skilled in the relevant art will appreciate that upon identification of appropriate origin servers 112 (or other origin source utilized by the content provider), the content provider 104 can begin to direct requests for content from client computing devices 102 to the CDN service provider 106. Specifically, in accordance with DNS routing principles, client computing device requests corresponding to a resource identifier provided by the content provider 104, but identifying a domain associated with the CDN service provider 106 would eventually be directed toward a POP 116, 122, 128 associated with the CDN service provider. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate one or more content provider identifiers that will be transmitted by the client computing devices 102 as part of the DNS queries preceding content requests. Illustratively, the content provider identifiers may be unique identifiers associated with a single content provider 104. Alternatively, the content provider identifier may be unique identifiers associated with groupings or sets of content providers 104. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translation of resource identifiers to identify a domain of the CDN service provider 106 can be generally referred to as a "modified URL." The general translation of resource identifiers will be described below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process discussed above, the content provider URL is modified such that requests for the resources associated with the modified URLs resolve to a POP associated with the CDN service provider 106. In one embodiment, the modified URL identifies the domain of the CDN service provider 106 (e.g., "cdnprovider.com"), the same name of the resource to be requested (e.g., "resource.xxx") and the same path where the resource will be found (e.g., "path"). Additionally, the modified URL can include various additional pieces of information utilized by the CDN service provider 106 during the request routing process. Specifically, in an illustrative embodiment, the modified URL can include data indicative of content provider identifier that allows for the association of prioritization information specified by the content provider 104. Alternatively, the modified URL can also include the prioritization directly in the modified URL. In this embodiment, the modified URL would have the form of:

http://content_provider_identifier.cdnprovider.com/path/resource.xxx

Additionally, the modified URL can include any additional information utilized by the CDN service provider during the request routing information, including, but not limited to, service plan information, file identifiers, and the like. The modified URL would have the form of:

http://additional_information.content_provider_identifier.cdnprovider.com/path/resource.xxx In another embodiment, the information associated with the CDN service provider 106 is included the modified URL, such as through prepending or other techniques, such that the modified URL can maintain all of the information associated with the original URL. In this embodiment, the modified URL would have the form of:

http://additional_information.content_provider_identifier.cdnprovider.com/www.contentprovider.com/path/resource.xxx Illustratively, the modified URLs are embedded into requested content in a manner such that DNS queries for the modified URLs will resolve to a DNS sever corresponding to the CDN service provider 106 and not a DNS nameserver corresponding to the content provider 104. Although the translation process is illustrated in FIG. 3, in some embodiments, the translation process may be omitted in a manner described in greater detail below.

With reference now to FIG. 4A, after completion of the registration and translation processes illustrated in FIG. 3, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally in the form of the modified URLs, described above.

Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 110. Upon receipt of the returned CNAME, the client computing device 102 subsequently transmits a DNS query corresponding to the received CNAME. The client computing device 102 can then process the received CNAME in a manner similar to the modified URLs, described below. For case of illustration, however, the alternative embodiment will not be described in further detail and the additional processing steps will only be described with regard to the modified URL. One skilled in the relevant will appreciate that the below description may be applicable to CNAMEs as described in the alternative embodiment.

Upon receipt of the requested content, the client computing device 102, such as through a browser software application, begins processing any of the markup code included in the content and attempts to acquire the resources identified by the embedded resource identifiers. Accordingly, the first step in acquiring the content correspond to the issuance, by the client computing device 102 (through its local DNS resolver), a DNS query for the modified URL resource identifier that results in the identification of a DNS nameserver authoritative to the "." and the "com" portions of the modified URL. After partially resolving the "." and "com" portions of the embedded URL, the client computing device 102 then issues another DNS query for the resource URL that results in the identification of a DNS nameserver authoritative to the ".cdnprovider" portion of the embedded URL. The issuance of DNS queries corresponding to the "." and the "com" portions of a URL are well known and have not been illustrated.

With reference now to FIG. 4B, in an illustrative embodiment, the successful resolution of the "cdnprovider" portion of the original URL identifies a network address, such as an IP address, of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS nameserver component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4B, in either of the above identified embodiments (or any other embodiment), a specific DNS nameserver in the DNS component 118 of a POP 116 illustratively receives the DNS query corresponding to the original URL from the client computing device 102. Once one of the DNS nameservers in the DNS component 118 receives the request, the specific DNS nameserver attempts to resolve the request. In an illustrative embodiment, a specific DNS nameserver can resolve the DNS query by identifying one or more IP addresses of cache server components that can process a subsequent request for the requested resource. As described above, a selected resource cache component can process the request by either providing the requested resource if it is available or attempt to obtain the requested resource from another source, such as a peer cache server computing device or the origin server 112 of the content provider 104.

With reference now to FIG. 4C, in an illustrative example, assume that the DNS nameserver component 130 has selected the resource cache component 132 of POP 128. Upon receipt of the IP address for the resource cache component 132, the client computing device 102 transmits requests for the requested content to the resource cache component 132. The resource cache component 132 processes the request in a manner described above and the requested content is transmitted to the client computing device 102. For purposes of the present application, in the interaction illustrated in FIGS. 4A-4C, the various components of individual POPs can collect performance metric information related to the processing of content requests from client devices 102. Illustratively, the collected performance metric information can include various performance metrics or key performance indicators utilized to assess the performance of individual POPs or the CDN. Such performance can illustratively include error frequency information, edge processing times or edge processing characterizations, request retries, connection/request retries, cache hit retries, cache misses, throughput measurements, CPU or memory consumption and the like. Performance metrics can also include information provided by client devices, such as client device identifiers, load times, latency information, rendering information, content types, ISP information, and the like. One skilled in the relevant art will appreciate that the disclosed performance metrics are illustrative in nature and should not be construed as limiting.

Turning now to FIG. 5, in an illustrative example, at (1), the POPs 116, 122, 128 can transmit the collected performance metric information to the CDN service provider 104. The POPs 116, 122, 128 may transmit the collected performance metric information periodically, based on trigger events, or other transmission criteria. In other embodiments, the POPs 116, 122, 128 may transmit responsive to requests from the CDN service provider 106 (e.g., a pull model). The performance metric information may be transmitted as log files or other formats configured by the CDN service provider 104, such as using an API.

The CDN service provider 106 can illustratively obtain the information that will be utilized as inputs to machine learned algorithms. Illustratively, the inputs can include the obtained log information and at least one additional CDN metric information obtained by the CDN service provider, such as historical CDN metric information or CDN configuration information associated with the specific customer configurations. By way of illustration, the CDN configuration information includes at least one of caching information, origin source information or API information. The CDN configuration information can also include configuration information or parameters related to other services utilized in conjunction with the implementation of the CDN, such as data storage (e.g., logging), data redundancy/recovery, data processing, and the like. Accordingly, at (2) the CDN service provider obtains the additional information such as via accessing data stores that maintain previously stored information, customer preferences, or configuration information. The CDN service provider can also utilize various API to contact additional third-party services to obtain configuration information that is not maintained by the CDN service provider or to ensure that the most current configuration information/parameter values are included.

At (3), the CDN service provider 106 identifies or selects the machine learned algorithms that will be evaluated.

Illustratively, the CDN service provider 106 can maintain individual machine learned algorithms that have been trained in accordance with different anomaly detection and remediation issues. The selection of the machine learned algorithms may be based on customer preferences or CDN provider preferences. In other embodiments, the CDN service provider 106 may evaluate the full set of machine learned algorithms, either periodically or based on evaluation criteria. In other embodiments, the CDN service provider 106 may use historical information related to previously detected anomalies by the specific customer or sets of customers to select which machine learned algorithms are evaluated.

At (4), the CDN service provider 106 applies the collected input to the identified set of machine learned algorithms to generate a set of recommendations, which are based on the outputs of selected machine-learned algorithms. In one embodiment, the content delivery network can then generate a set of recommendations, which are illustratively characterized as either CDN performance recommendations or CDN analysis recommendations for customers. By way of example, the CDN performance recommendations can be characterized as including cache configuration recommendations, compression configuration recommendations, time to live value recommendations, and the like. Similarly, the CDN analysis recommendations can be characterized as including include information characterizing client impact by an event, information characterizing origin source errors, information characterizing performance degradation, information characterizing cache performance, and the like. Customers receiving the recommendations can implement one or more configuration changes, mitigation techniques, etc., including configuring the CDN service provider with processing rules that allow for automatic implementation. Still further, in some embodiments, the recommendations can include configuration settings, parameter values, changes or other instructions for utilization with additional third-party services. For example, the recommendations can include a modification to the logging parameters (e.g., frequency of logging, size of data, data identification, etc.) that are recommendation for use with the CDN.

At (5), the CDN service provider 106 can then process the set of recommendations. For example, in one embodiment, the CDN service provider 106 can apply customer specific processing results to the set of target recommendations, such as identifying preferred mitigation techniques, prohibited mitigation techniques, prioritization of recommendations or mitigation techniques, and the like. In another embodiment, the CDN service provider 106 can apply financial criteria to the generated recommendations, such as eliminating recommendations that exceed financial thresholds, prioritizing individual recommendations, or maintaining a cumulative cost that can be applied to total financial thresholds. In still another embodiment, the CDN service provider 106*n* still a further embodiment, the CDN service provider 106 can filter recommendations based on various criteria, such as total numbers, characterized severity (e.g., high risk, low risk), characterized potential impact, and the like. In still another embodiment, the CDN service provider 106 can be configured to automatically apply recommendations (or authorize) based on configuration information.

At (6), the CDN service provider 106 can transmit the processed set of recommendations to the customer 101. Illustratively, the transmission can include the generation of user interfaces that allows the customer to view the recommendations and implement one or more recommendation actions. As described above, in some embodiments, the customer may configure automatic implementation of one or more recommendations. Still further, in some implementations, the transmitted information can include additional information or other configuration settings that the customer can utilize to implement recommendations.

Figure 6:
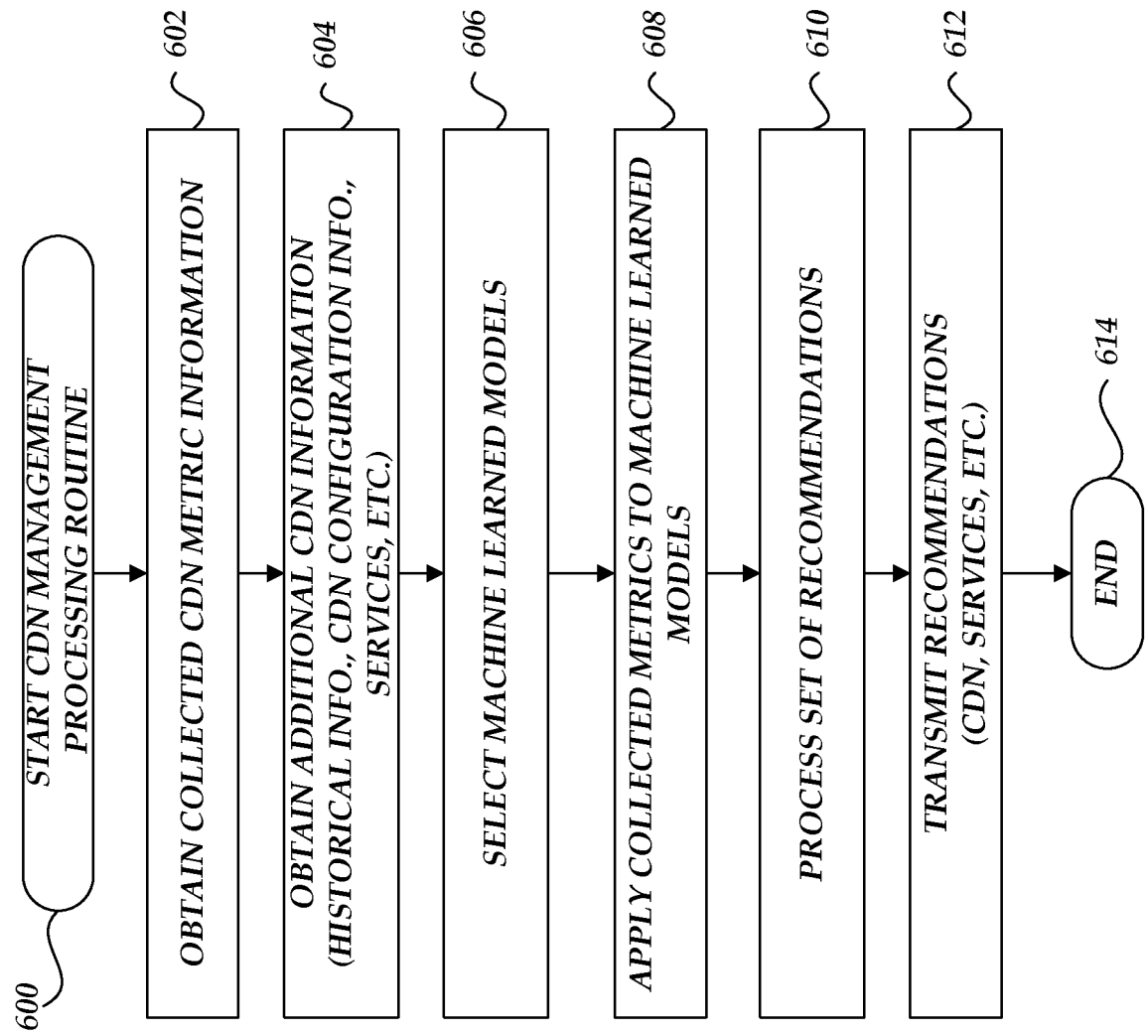
FIG. 6 is a flow diagram illustrative of a content delivery configuration recommendation routine implemented by a content delivery network service provider utilizing collected metric information associated with the processing of resource requests.

With reference now to FIG. 6, a request routine 600 implemented by the CDN provider 106 will be described. One skilled in the relevant art will appreciate that actions/steps outlined for routine 600 may be implemented by one or many computing devices/components that are associated with the CDN service provider 106. Accordingly, routine 600 has been logically associated as being performed by the CDN service provider 106.

At block 602, the CDN service provider 106 obtains a plurality of metric data from a set of POPs corresponding to the CDN network. Illustratively, the POPs 116, 122, 128 can transmit the collected performance metric information to the CDN service provider 104. The POPs 116, 122, 128 may transmit the collected performance metric information periodically, based on trigger events, or other transmission criteria. In other embodiments, the POPs 116, 122, 128 may transmit responsive to requests from the CDN service provider 106 (e.g., a pull model). The performance metric information may be transmitted as log files or other formats configured by the CDN service provider 104, such as using an API.

At block 604, the CDN service provider obtains the additional CDN information such as via accessing data stores that maintain previously stored information, customer preferences, or configuration information. The CDN service provider 106 can illustratively obtain the information that will be utilized as inputs to machine learned algorithms. Illustratively, the inputs can include the obtained log information and at least one additional CDN information obtained by the CDN service provider, such as historical CDN metric information or CDN configuration information associated with the specific customer configurations. By way of illustration, the CDN configuration information includes at least one of caching information, origin source information or API information.

At block 606, the CDN service provider 106 identifies or selects the machine learned algorithms that will be evaluated. Illustratively, the CDN service provider 106 can maintain individual machine learned algorithms that have been trained in accordance with different anomaly detection and remediation issues. The selection of the machine learned algorithms may be based on customer preferences or CDN provider preferences. In other embodiments, the CDN service provider 106 may evaluate the full set of machine learned algorithms, either periodically or based on evaluation criteria. In other embodiments, the CDN service provider 106 may use historical information related to previously detected anomalies by the specific customer or sets of customers to select which machine learned algorithms are evaluated.

At block 608, the CDN service provider 106 applies the collected input to the identified set of machine learned algorithms to generate a set of recommendations, which are based on the outputs of selected machine-learned algorithms. In one embodiment, the content delivery network can then generate a set of recommendations, which are illustratively characterized as either CDN performance recommendations or CDN analysis recommendations for customers. By way of example, the CDN performance recommendations can be characterized as including cache configuration recommendations, compression configuration recommendations, time to live value recommendations, and the like. Similarly, the CDN analysis recommendations can be characterized as including include information characterizing client impact by an event, information characterizing origin source errors, information characterizing performance degradation, information characterizing cache performance, and the like. Customers receiving the recommendations can implement one or more configuration changes, mitigation techniques, etc., including configuring the CDN service provider with processing rules that allow for automatic implementation. Still further, in some embodiments, the recommendations can include configuration settings, parameter values, changes or other instructions for utilization with additional third-party services. For example, the recommendations can include a modification to the data processing services that may be utilized to process CDN data, such as I/O resources, data processing capabilities, and the like.

At block 610, the CDN service provider 106 can then process the set of recommendations. For example, in one embodiment, the CDN service provider 106 can apply customer specific processing results to the set of target recommendations, such as identifying preferred mitigation techniques, prohibited mitigation techniques, prioritization of recommendations or mitigation techniques, and the like. In another embodiment, the CDN service provider 106 can apply financial criteria to the generated recommendations, such as eliminating recommendations that exceed financial thresholds, prioritizing individual recommendations, or maintaining a cumulative cost that can be applied to total financial thresholds. In still another embodiment, the CDN service provider 106*n* still a further embodiment, the CDN service provider 106 can filter recommendations based on various criteria, such as total numbers, characterized severity (e.g., high risk, low risk), characterized potential impact, and the like. In still another embodiment, the CDN service provider 106 can be configured to automatically apply recommendations (or authorize) based on configuration information.

At block 612, the CDN service provider 106 can transmit the processed set of recommendations to the customer 101. Illustratively, the transmission can include the generation of user interfaces that allows the customer to view the recommendations and implement one or more recommendation actions. As described above, in some embodiments, the customer may configure automatic implementation of one or more recommendations. Still further, in some implementations, the transmitted information can include additional information or other configuration settings that the customer can utilize to implement recommendations. At block 614, the routine 600 terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might." or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content delivery network (CDN) performance comprising:
a plurality of points of presence (P.O.P.), wherein individual P.O.P.s provide content responsive to client device requests and wherein individual P.O.P.s generate log information corresponding to collected CDN performance metrics associated with providing the content response to the client requests;
one or more computing devices maintaining a plurality of data stores, wherein the plurality of data stores maintain information related to collected CDN performance metric information, historical CDN performance metric information and CDN configuration information;
a CDN management component, executed on a computing device having process resources, the CDN management component operable to:
obtain the log information from the plurality of P.O.P.s;
obtain the historical CDN performance metrics information;
obtain the CDN configuration information;
apply the obtained log information, historical CDN performance metrics information, and CDN configuration information as inputs to a plurality of machine learning algorithms to generate a set of target recommendations, wherein individual machine learning algorithms are trained according to an identified anomaly in the operation of a CDN and wherein the generated set of recommendations includes at least one CDN performance recommendation and at least one CDN analysis recommendation,
wherein the CDN performance recommendations include at least one of cache configuration recommendations, compression configuration recommendations, or time to live value recommendations, and wherein the CDN analysis recommendations include information for characterizing a client impact, the information including at least one of origin source errors, performance degradations, or cache performances;
process the set of target recommendations; and
transmit the processed set of target recommendations.

2. The system as recited in claim 1, wherein the log information from the plurality of P.O.P.s includes traffic type information, error rate information, throughput information, requesting device type information and network identification information.

3. The system as recited in claim 1, wherein the CDN configuration information includes caching information, origin source information, and API information.

4. The system as recited in claim 1, wherein processing the set of target recommendations includes applying customer specific processing results to the set of target recommendations.

5. A method for managing content delivery network (CDN) performance comprising:
obtaining log information from a plurality of P.O.P.s associated with the CDN;
obtaining at least one additional CDN metric information;
selecting a machine learning algorithm from a plurality of machine learning algorithms, wherein individual machine learning algorithms of the plurality of machine learning algorithms are trained according to an identified anomaly in an operation of a CDN;
applying the obtained log information and the at least one additional CDN metric information as inputs to the selected machine learning algorithm to generate a set of recommendations, wherein the generated set of recommendations includes at least one of CDN performance recommendations and at least one CDN analysis recommendations, wherein the CDN performance recommendations include at least one of cache configuration recommendations, compression configuration recommendations, or time to live value recommendations, and wherein the CDN analysis recommendations include information for characterizing a client impact, the information including at least one of origin source errors, performance degradations, or cache performances; and
transmitting the generated set of recommendations.

6. The method as recited in claim 5, wherein the at least one additional CDN metric information includes historical CDN performance metric information.

7. The method as recited in claim 5, wherein the at least one additional CDN metric information includes CDN configuration information.

8. The method as recited in claim 7, wherein the CDN configuration information includes at least one of caching information, origin source information or API information.

9. The method as recited in claim 7, wherein the CDN configuration information includes configuration information for at least one additional service utilized by the CDN.

10. The method as recited in claim 5, wherein the generated set of recommendations includes at least one CDN performance recommendation and at least one CDN analysis recommendation.

11. The method as recited in claim 5, wherein the CDN performance recommendations include cache configuration recommendations.

12. The method as recited in claim 5, wherein the CDN performance recommendations include latency configuration recommendations.

13. The method as recited in claim 5, wherein the CDN performance recommendations include compression configuration recommendations.

14. The method as recited in claim 5, wherein the CDN performance recommendation includes time to live value recommendations.

15. The method as recited in claim 5, wherein the CDN analysis recommendations include information characterizing client impact by an event.

16. The method as recited in claim 5, wherein the CDN analysis recommendations include information characterizing origin source errors.

17. The method as recited in claim 5, wherein the CDN analysis recommendations include information characterizing performance degradation.

18. The method as recited in claim 5, wherein the CDN analysis recommendations include information characterizing cache performance.

19. The method as recited in claim 5 further comprising processing the generated set of recommendations prior to transmission.

20. The method as recited in claim 19, wherein processing the generated set of recommendations includes applying customer specific processing results to the generated set of recommendations.

21. The method as recited in claim 19, wherein processing the generated set of recommendations includes applying financial criteria to the generated recommendations.

22. The method as recited in claim 19, wherein processing the generated set of recommendations includes filtering at least one generated recommendation.

23. A method for managing content delivery network (CDN) performance comprising:
identifying at least one machine learning algorithm trained according to an identified anomaly in an operation of a CDN;
applying obtained log information, historical CDN performance metrics information, and CDN configuration information as inputs to the identified machine learning algorithm to generate a set of recommendations, wherein the generated set of recommendations includes at least one of CDN performance recommendations and at least one CDN analysis recommendations,
wherein the CDN performance recommendations include at least one of cache configuration recommendations, compression configuration recommendations, or time to live value recommendations, and wherein the CDN analysis recommendations include information for characterizing a client impact, the information including at least one of origin source errors, performance degradations, or cache performances; and
transmitting the generated recommendations.

24. The method as recited in claim 23, wherein the generated set of recommendations includes at least one CDN performance recommendation and at least one CDN analysis recommendation.

25. The method as recited in claim 23 further comprising processing the generated recommendations prior to transmission.

26. The method as recited in claim 23, wherein the generated set of recommendations includes a recommendation for at least one additional service utilized in conjunction with the CDN.

* * * * *